United States Patent [19]

Lawrence

[11] 4,042,641
[45] Aug. 16, 1977

[54] INHIBITING PREMATURE VULCANIZATION OF RUBBERS WITH N-ARYL-HYDROCARBYLDITHIO-FORMIMIDATE

[75] Inventor: John P. Lawrence, Stow, Ohio

[73] Assignee: The Goodyear Tire & Rubber Company, Akron, Ohio

[21] Appl. No.: 666,286

[22] Filed: Mar. 12, 1976

[51] Int. Cl.$^2$ .................. C08C 11/54; C08D 9/00
[52] U.S. Cl. .................. 260/780; 260/79.5 B; 260/453 R; 260/453 RW
[58] Field of Search .......... 260/79.5 A, 79.5 P, 260/79.5 C, 79.5 B, 780, 783, 793, 453 RW; 526/30

[56] References Cited

U.S. PATENT DOCUMENTS 3,790,534  2/1974  Gattuso .................. 260/79.5 B

Primary Examiner—Christopher A. Henderson, Jr.
Attorney, Agent, or Firm—F. W. Brunner; J. A. Rozmajzl

[57] ABSTRACT

Premature vulcanization of rubbers is inhibited by the incorporation therein of a dithioformimidate compound such as methyl N-phenyl-1-(methyldithio)-formimidate.

10 Claims, No Drawings

INHIBITING PREMATURE VULCANIZATION OF RUBBERS WITH N-ARYL-HYDROCARBYLDITHIO-FORMIMIDATE

BACKGROUND OF THE INVENTION

This invention relates to the inhibition of premature vulcanization in rubber by the use of compounds which are novel as inhibitors. More particularly, the invention relates to a method for preventing the premature vulcanization of rubber stocks.

Scorching during the processing of rubber is due to the premature or incipient vulcanization which may occur during any of the steps involved in the processing prior to the final vulcanization step, or during storage between said processing steps. Whereas a properly compounded unscorched rubber formulation can be die-extruded or sheeted from a calender smoothly and without lumping, a scorched material often becomes wavy and lumpy after extrusion or sheeting, and must be discarded.

It is also desirable for esthetic reasons that any compound used as a retarder does not bloom on the surface of the vulcanized rubber.

An object of the present invention is to provide a method of inhibiting premature vulcanization of rubber. Another object of the present invention is to provide scorch inhibitors and retarders for use in rubber processing. Another object is to provide a scorch inhibitor compound which has low bloom tendencies.

SUMMARY OF THE INVENTION

According to the present invention there is provided a method of inhibiting premature vulcanization of rubber containing a vulcanizing agent and an organic vulcanization accelerating agent which comprises incorporating therein in an amount effective to inhibit premature vulcanization, a compound selected from the group of retarders having the following structural formula:

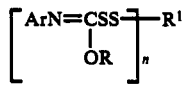

wherein Ar is an aryl radical derived from a benzenoid aromatic nucleus (6 to 10 carbon atoms) optionally substituted on the nucleus with one or two groups selected from the group consisting of chloro, nitro, alkyl and alkoxy groups, the alkyl and alkoxy groups containing 1 to 4 carbon atoms. The aryl radicals include benzene and naphthalene and those derived therefrom. R is an alkyl (1 to 20 carbon atoms), cycloalkyl (5 to 20 carbon atoms) including alkyl substituted (1 or 2 alkyl substituents) cycloalkyls where the alkyl group has 1 to 4 carbon atoms, aryl (6 to 10 carbon atoms) or aralkyl (7 to 20 carbon atoms), the aryl and aralkyl radicals being unsubstituted. When n is 1, $R^1$ is selected from the same group of radicals as described for R. When n is 2, $R^1$ is a straight chain or branched alkylene (2 to 10 carbon atoms) or cycloalkylene (5 to 20 carbon atoms) radical. Neither the alkylene nor cycloalkylene groups are substituted.

The following list of compounds illustrate, but do not limit, the retarders of the present invention.

| Retarder | |
|---|---|
| 1 | Methyl N-phenyl-1-(methyldithio)-formimidate |
| 2 | Methyl N-phenyl-1-(ethyldithio)-formimidate |
| 3 | Methyl N-phenyl-1-(1-propyldithio)-formimidate |
| 4 | Methyl N-phenyl-1-(2-propyldithio)-formimidate |
| 5 | Methyl N-phenyl-1-(1-butyldithio)-formimidate |
| 6 | Methyl N-phenyl-1-(1-hexyldithio)-formimidate |
| 7 | Methyl N-phenyl-1-(1-octyldithio)-formimidate |
| 8 | Methyl N-phenyl-1-(dodecyldithio)-formimidate |
| 9 | Methyl N-phenyl-1-(cyclohexyldithio)-formimidate |
| 10 | Methyl N-phenyl-1-(phenyldithio)-formimidate |
| 11 | Methyl N-phenyl-1-(p-chlorophenyldithio)-formimidate |
| 12 | Methyl N-phenyl-1-(benzyldithio)-formimidate |
| 13 | Ethyl N-phenyl-1-(ethyldithio)-formimidate |
| 14 | Ethyl N-phenyl-1-(1-propyldithio)-formimidate |
| 15 | Ethyl N-phenyl-1-(2-propyldithio)-formimidate |
| 16 | Ethyl N-phenyl-1-(1-butyldithio)-formimidate |
| 17 | Ethyl N-phenyl-1-(1-hexyldithio)-formimidate |
| 18 | Ethyl N-phenyl-1-(1-octyldithio)-formimidate |
| 19 | Ethyl N-phenyl-1-(1-dodecyldithio)-formimidate |
| 20 | Ethyl N-phenyl-1-(cyclohexyldithio)-formimidate |
| 21 | Ethyl N-phenyl-1-(phenyldithio)-formimidate |
| 22 | Ethyl N-phenyl-1-(benzyldithio)-formimidate |
| 23 | 1-Propyl N-phenyl-1-(ethyldithio)-formimidate |
| 24 | 1-Propyl N-phenyl-1-(1-dodecyldithio)-formimidate |
| 25 | 2-Propyl N-phenyl-1-(ethyldithio)-formimidate |
| 26 | 2-Propyl N-phenyl-1-(2-propyldithio)-formimidate |
| 27 | 2-Propyl N-phenyl-1-(1-octyldithio)-formimidate |
| 28 | 2-Propyl N-phenyl-1-(1-dodecyldithio)-formimidate |
| 29 | 2-Propyl N-phenyl-1-(benzyldithio)-formimidate |
| 30 | 2-Propyl N-phenyl-1-(phenyldithio)-formimidate |
| 31 | 2-Propyl N-phenyl-1-(cyclohexyldithio)-formimidate |
| 32 | 1-Butyl N-phenyl-1-(ethyldithio)-formimidate |
| 33 | Cyclohexyl N-phenyl-1-(ethyldithio)-formimidate |
| 34 | Benzyl N-phenyl-1-(phenyldithio)-formimidate |
| 35 | Phenyl N-phenyl-1-(benzyldithio)-formimidate |
| 36 | Methyl N-o-tolyl-1-(ethyldithio)-formimidate |
| 37 | Methyl N-o-tolyl-1-(2-propyldithio)-formimidate |
| 38 | Methyl N-o-tolyl-1-(1-dodecyldithio)-formimidate |
| 39 | Methyl N-o-tolyl-1-(benzyldithio)-formimidate |
| 40 | Methyl N-o-tolyl-1-(cyclohexyldithio)-formimidate |
| 41 | Ethyl N-o-tolyl-1-(ethyldithio)-formimidate |
| 42 | Ethyl N-o-tolyl-1-(1-dodecyldithio)-formimidate |
| 43 | 2-Propyl N-o-tolyl-1-(ethyldithio)-formimidate |
| 44 | 2-Propyl N-o-tolyl-1-(1-dodecyldithio)-formimidate |
| 45 | Methyl N-p-tolyl-1-(ethyldithio)-formimidate |
| 46 | Methyl N-p-nitrophenyl-1-(ethyldithio)-formimidate |
| 47 | Methyl N-p-chlorophenyl-1-(ethyldithio)-formimidate |
| 48 | Methyl N-o-chlorophenyl-1-(ethyldithio)-formimidate |
| 49 | Methyl N-p-methoxyphenyl-1-(ethyldithio)-formimidate |
| 50 | Methyl N-3,4-dichlorophenyl-1-(ethyldithio)-formimidate |
| 51 | Methyl N-1-naphthyl-1-(ethyldithio)-formimidate |
| 52 | Isobutyl N-phenyl-1-(ethyldithio)-formimidate |
| 53 | 1,1'-Ethylenedithiobis(methyl N-phenylformimidate) |
| 54 | 1,1'-Tetramethylenedithiobis(methyl N-phenylformimidate) |
| 55 | 1,1'-Hexamethylenedithiobis(methyl N-phenylformimidate) |
| 56 | 1,1'-Octamethylenedithiobis(methyl N-phenylformimidate) |
| 57 | 1,1'-Decamethylenedithiobis(methyl N-phenylformimidate) |
| 58 | 1,1'(1,2-Propylenedithio)-bis(methyl N-phenylformimidate) |
| 59 | 1,1'-Ethylenedithiobis(ethyl N-phenylformimidate) |
| 60 | 1,1'-Ethylenedithiobis(2-propyl N-phenylformimidate) |
| 61 | 1,1'-Ethylenedithiobis(methyl N-o-tolylformimidate) |
| 62 | 1,1'-Ethylenedithiobis(methyl N-p-tolylformimidate) |
| 63 | 1,1'-Ethylenedithiobis(methyl N-o-chlorophenylformimidate) |
| 64 | 1,1'-Ethylenedithiobis(methyl N-p-chlorophenylformimidate) |
| 65 | 1,1'-Ethylenedithiobis(methyl N-p-methoxyphenylformimidate) |
| 66 | Ethyl N-p-methoxyphenyl-1-(ethyldithio)-formimidate |
| 67 | Ethyl N-p-tolyl-1-(ethyldithio)-formimidate |
| 68 | Ethyl N-o-chlorophenyl-1-(ethyldithio)-formimidate |
| 69 | Ethyl N-p-chlorophenyl-1-(ethyldithio)-formimidate |
| 70 | Ethyl N-3,4-dichlorophenyl-1-(ethyldithio)-formimidate |
| 71 | Ethyl N-p-nitrophenyl-1-(ethyldithio)-formimidate |
| 72 | Ethyl N-1-naphthyl-1-(ethyldithio)-formimidate |

PREFERRED EMBODIMENTS

The following radicals are representative of the radical Ar, the preferred radicals being designated by an asterisk (*).
* Phenyl
* o-Tolyl
  m-Tolyl
* p-Tolyl
* o-Chlorophenyl
  p-Chlorophenyl
* p-Chlorophenyl
  3,4-Dichlorophenyl
  p-Nitrophenyl
  p-Bromophenyl
* p-Methoxyphenyl
  1-Naphthyl
  2-Naphthyl.

The following radicals are representative of the radical R.
* Methyl
* Ethyl
  1-Propyl
  2-Propyl
  1-Butyl
  1-Butyl
  Isobutyl
  Tert. butyl
  1-Hexyl
  1-Octyl
  1-Dodecyl
  1-Hexadecyl
  1-Eicosyl
  Cyclohexyl
  Benzyl
  Phenyl.

The following radicals are representative of the radicals R' when when n is 1.
* Methyl
* Ethyl
  1-Propyl
* 2-Propyl
* 1-Butyl
  2-Butyl
  Isobutyl
  Tert.butyl
* 1-Hexyl
* 1-Octyl
* 1-Dodecyl
  1-Hexadecyl
  1-Eicosyl
* Cyclohexyl
* Benzyl
* Phenyl
  p-Chlorophenyl.

The following are representative of the radical R¹ when n is 2.
* 1,2-Ethylene
* 1,2-Propylene
  1,3-Propylene
* 1,4-Tetramethylene
* 1,6-Hexamethylene
  1,8-Octamethylene
  1,10-Decamethylene
  1,4-Cyclohexylene.

By combining the above illustrative radicals for Ar, R and R', one obtains a multitude of illustrative compounds.

The thiosulfenylformimidates are prepared by reaction of a sulfenyl chloride with a thionocarbamate in the presence of an acid acceptor such as pyridine or triethylamine as described by J. F. Harris, Jr. in *J. Amer. Chem. Soc.*, 82, 155(1960).

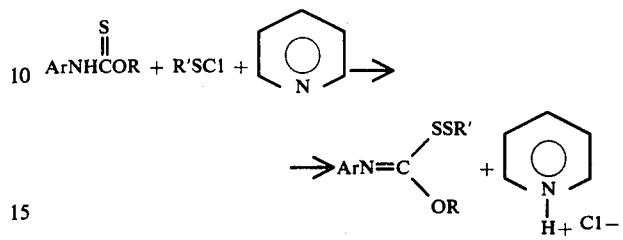

The thionocarbamates are prepared by reaction of an alcohol with an isothiocyanate as is well known in the literature.

The performance of the compounds of the present invention as retarders is not dependent upon their method of preparation.

This invention is applicable to rubber mixes containing sulfur-vulcanizing agents, peroxide-vulcanizing agents, organic accelerators for vulcanization and antidegradants, neither being the inhibitor used. For the purposes of this invention, sulfur-vulcanizing agent means elemental sulfur or sulfur containing vulcanizing agent, for example, an amine disulfide or a polymeric polysulfide. The invention is applicable to vulcanization accelerators of various classes. For example, rubber mixes containing the aromatic thiazole accelerators which include benzothiazyl-2-monocyclohexyl sulfenamide, 2-mercaptobenzothiazole, N-tert-butyl-2-benzothiazole sulfenamide, 2-benzothiazolyl diethyldithiocarbamate and 2-(morpholinothio)benzothiazole can be used. Other thiazole accelerators which may be used include 2-(aminodithio)-thiazoles and 2-(aminotrithio)-thiazoles such as 2-(morpholinodithio)-benzothiazole. Amine salts of mercaptobenzothiazole accelerators for example, the t-butyl amine salt of mercaptobenzothiazole, and like salts of morpholine and 2,6-dimethyl morpholine can be used in the invention. Thiazole accelerators other than aromatic can be used. Stocks containing accelerators, for example tetramethylthiuram disulfide, tetramethylthiuram monosulfide, aldehyde amine condensation products, thiocarbamylsulfenamides, thioureas, xanthates, and guanidine derivatives are substantially improved using the process of our invention.

The inhibitors of the invention can be used in natural and synthetic rubbers and mixtures thereof. Synthetic rubbers that can be improved by the process of this invention include cis-1,4-polybutadiene, butyl rubber, ethylene-propylene terpolymers, polymers of 1,3-butadienes, for example, 1,3-butadiene itself and of isoprene, copolymers of 1,3-butadiene with other monomers, for example, styrene, acrylonitrile, isobutylene and methyl methacrylate. Ethylene propylene terpolymers, for example ethylene/propylene/dicyclopentadiene terpolymers can benefit from the present invention. The invention is of particular value with reference to the diene rubbers and the term "rubber" is used herein to include both diene rubber and other rubbers.

The following examples illustrate the preparation of compounds of the present invention.

EXAMPLE 1

Sulfuryl chloride (6.8 grams, 0.05 mole) was added dropwise to a stirred solution of 3.1 grams (0.05 mole) of ethanethiol in 50 milliliters of toluene at −30° C. under nitrogen. The resulting solution of ethanesulfenyl chloride was stirred 30 minutes at −30° C. and then added dropwise to a stirred solution of 8.4 grams (0.05 mole) of O-methyl-N-phenylthionocarbamate and 8.0 grams (0.1 mole) of pyridine in 100 milliliters of toluene at 0° to 5° C. The mixture was allowed to warm to 20° C. and then filtered from precipitated pyridine hydrochloride. The filtrate was washed with water, dried with magnesium sulfate and concentrated in vacuo to afford 10.7 grams (a 94.3% yield) of the product as a pale yellow liquid. The product was methyl N-phenyl-1-(ethyldithio)-formimidate.

EXAMPLE 2

Sulfuryl chloride (6.8 grams, 0.05 mole) was added dropwise to a stirred solution of 2.4 grams (0.025 mole) of 1,2-ethanedithiol in 50 milliliters of toluene under nitrogen at 0° to 10° C. The mixture was stirred at room temperature until the precipitated poly(disulfide) intermediate had reacted and passed into solution. The resulting bis(sulfenyl chloride) solution was then added dropwise to a stirred solution of 8.4 grams (0.05 mole) of O-methyl N-phenylthionocarbamate, 8.0 grams (0.10 mole) of pyridine and 100 milliliters of toluene at 0° to 5° C. After stirring a few minutes the mixture was filtered, the filtrate washed with water, dried (MgSO₄) and concentrated under reduced pressure to afford 10.6 grams (100%) of white solid 1,1'-ethylenedithiobis(-methyl N-phenylformimidate); with a melting point of 60° to 62° C.

A number of compounds were evaluated as retarders in the following natural rubber formulations.

| Retarder Number | Table I<br>Mooney Scorch at 270° F.<br>(time to 5 pt. rise)<br>(minutes) | % Increase Over Control |
| --- | --- | --- |
| Control | 11.5 | — |
| 1 | 25.0 | 117 |
| 2 | 27.8 | 142 |
| 3 | 29.4 | 156 |
| 4 | 29.3 | 155 |
| 5 | 28.2 | 145 |
| 9 | 26.0 | 126 |
| 12 | 25.1 | 118 |
| 10 | 24.0 | 109 |
| 7 | 29.2 | 154 |
| 8 | 29.2 | 154 |
| Table II | | |
| Control | 11.2 | — |
| 2 | 24.6 | 120 |
| 13 | 25.5 | 128 |
| 25 | 26.4 | 136 |
| 32 | 24.3 | 117 |
| 52 | 24.7 | 121 |
| Table III | | |
| Control | 12.8 | — |
| 13 | 28.0 | 119 |
| 66 | 27.1 | 112 |
| 67 | 28.9 | 126 |
| 68 | 28.4 | 122 |
| 69 | 28.2 | 120 |
| 70 | 26.2 | 105 |
| 71 | 22.1 | 73 |
| 72 | 22.7 | 77 |
| Table IV | | |
| Control | 13.6 | — |
| 53 | 27.7 | 104 |
| 54 | 26.0 | 91 |
| 55 | 25.9 | 90 |

The retarder compounds were added in the amount of 2.5 millimoles per 100 grams of natural rubber.

Mooney scorch data was obtained on each of the stocks. The scorch properties were determined with a large rotor Mooney viscometer at 270° F. (ASTM D-1077-55T). The values represent the number of minutes for rubber containing a vulcanization agent to increase in viscosity by five points. A large scorch time indicates a high resistance to scorching. The results are reported in Tables I to IV.

The retarders are identified by retarder numbers which have been assigned to specific compounds earlier herein.

| Ingredients | Parts by Weight |
| --- | --- |
| Natural Rubber | 100.0 |
| HAF Black | 50.0 |
| Zinc Oxide | 3.0 |
| Stearic Acid | 3.0 |
| Processing Oil | 3.0 |
| Sulfur | 2.5 |
| Wing-Stay 100 | 1.0 |
| 2-(Morpholinothio)-benzothiazole | 0.5 |

Monsanto rheometer data was also gathered on the same stocks. It also demonstrated retarder activity and indicated, as well, that the presence of the retarder had no effect on the state of vulcanization. The effect of the retarder on vulcanization rate was nominal.

Bloom was not evident on the surfaces of any of the vulcanizates.

The above results show that all of the compounds tested were very effective as retarders.

The above examples are not intended to be limiting, but rather illustrative. Any of the retarders, accelerators and rubbers described earlier herein can be substituted in the preceding examples to obtain retardation effects. In addition the levels of the retarders and other components in said examples could be altered in accordance with the general teachings herein and retardation effects would be obtained. Peroxides, such as dicumyl peroxides, could also be used in said examples with or without the presence of sulfur and/or sulfur donating compounds.

Retarders within the practice of the present invention other than those described in the preceding examples have been synthesized and tested positively as retarders.

The retarders of this invention may be used at concentrations of from 0.10 part to 5.0 parts by weight of retarder per 100 parts by weight of rubber and even from 0.05 to 10.0 parts. Preferably the concentration ranges from 0.25 to 5.0 parts, more preferably from 0.25 to 3.0 parts and most preferably from 0.25 to 1.50 parts. A major advantage of these retarders are that they are relatively non-blooming.

The retarders of the present invention are preferably added to the rubbery polymer at the same time that the accelerator is added, although this order of addition is not necessary to the successful utilization of the compounds of this invention.

The data in the preceding working examples are representative of the fact that the compounds of the present invention are effective as retarders in the presence of organic accelerators whether they are diaryl guanidines such as diphenylguanidine, or thiazoles, more specifically benzothiazyl amino disulfides, such as 2-(morpholinodithio)benzothiazole, or thiazoles (also sulfenamides), more specifically thiazolesulfenamides, and even more specifically benzothiazolesulfenamides such as 2-(morpholinothio)benzothiazole and N-cyclohexyl-2-benzothiazolesulfenamide, i.e., regardless of what type of organic accelerator is used. Thiuram sulfides such as tetramethyl thiuram monosulfide and disulfide and tetraethylthiuram monosulfide and disulfide may also be used as well as other benzothiazolesulfenamides such as N-(t-butyl)-2-benzothiazolesulfenamide.

Various organic accelerators useful within the practice of this invention are described and illustrated in the Vanderbilt Rubber Handbook, 1968 Edition, R. T. Vanderbilt Company, Inc., particularly at pages 242 to 244 and also in the bulletin of the Elastomer Chemical Dept. of the E. I. du Pont de Nemours and Co. (Inc.) entitled, "Accelerators, Vulcanizing Agents and Retarders, Brochure No. SD A54457."

The polymers in which the retarders of the present invention are incorporated remain suitable for their art recognizing uses, e.g., in tires and industrial products.

While certain representative embodiments and details have been shown for the purpose of illustrating the invention, it will be apparent to those skilled in this art that various changes and modifications may be made therein without departing from the spirit or scope of the invention.

I claim:

1. A rubber composition comprising vulcanizable diene rubber containing, in an amount effective to inhibit premature vulcanization thereof, a compound having the following structural formula

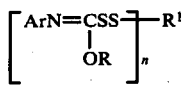

wherein Ar is an aryl radical derived from a benzenoid aromatic nucleus having 6 to 10 carbon atoms which is unsubstituted or substituted on the nucleus with one or two groups selected from the group consisting of chloro, nitro, alkyl and alkoxy groups, the alkyl and alkoxy groups containing 1 to 4 carbon atoms; wherein R is selected from the group consisting of alkyl radicals having 1 to 20 carbon atoms, cycloalkyl radicals having 5 to 20 carbon atoms and being unsubstituted or substituted with 1 or 2 alkyl radicals having 1 to 4 carbon atoms, aryl radicals having 6 to 10 carbons atoms and aralkyl radicals having 7 to 20 carbon atoms; wherein when n is 1, $R^1$ is selected from the same group of radicals as described for R and wherein when n is 2, $R^1$ is selected from the group consisting of straight chain or branched alkylene radicals having 2 to 10 carbon atoms and cycloalkylene radicals having 5 to 20 carbon atoms.

2. The rubber composition according to claim 1, wherein the compound is present in the amount of from 0.10 part of 5.0 parts by weight per 100 parts by weight of rubber.

3. The rubber composition according to claim 2, wherein the rubber contains a sulfur vulcanization agent.

4. The rubber composition according to claim 3, wherein the rubber contains an organic vulcanization accelerating agent.

5. The rubber composition according to claim 4, wherein the rubber contains an organic vulcanization accelerating agent selected from the group consisting of thiazoles, diaryl guanidines and thiuram sulfides.

6. The rubber composition according to claim 4, wherein Ar is selected from the group consisting of phenyl, o-tolyl, p-tolyl, o-chlorophenyl, p-chlorophenyl and p-methoxyphenyl, wherein R is selected from the group consisting of methyl, ethyl and 2-propyl, wherein when n is 1, $R^1$ is selected from the group consisting of methyl, ethyl, 1-propyl, 2-propyl, 1-butyl, 1-hexyl, 1-octyl, 1-dodecyl, cyclohexyl, benzyl and phenyl, and wherein, when n is 2, $R^1$ is selected from the group consisting of 1,2-ethylene, 1,2-propylene, 1,4-tetramethylene and 1,6-hexamethylene.

7. The rubber composition according to claim 2, wherein the compound is selected from the group consisting of methyl N-phenyl-1-(ethyldithio)-formimidate, methyl N-phenyl-1-(dodecyldithio)-formimidate, ethyl N-phenyl-1-(ethyldithio)-formimidate and ethyl N-p-tolyl-1-(ethyldithio)-formimidate.

8. A method of inhibiting premature vulcanization of diene rubber containing a sulfur-vulcanizing agent and an organic vulcanization accelerating agent selected from the group consisting of thiazoles, diaryl guanadines and thiuram sulfides which comprises incorporating therein 0.10 parts to 5.0 parts by weight per 100 parts by weight of rubber of at least one compound having the following structural formula:

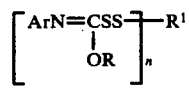

wherein Ar is an aryl radical derived from a benzenoid aromatic nucleus having 6 to 10 carbon atoms which is unsubstituted or substituted on the nucleus with one or two groups selected from the group consisting of chloro, nitro, alkyl and alkoxy groups, the alkyl and alkoxy groups containing 1 to 4 carbon atoms; wherein R is selected from the group consisting of alkyl radicals having 1 to 20 carbon atoms, cycloalkyl radicals having 5 to 20 carbon atoms and being unsubstituted or substituted with 1 or 2 alkyl radicals having 1 to 4 carbon atoms, aryl radicals having 6 to 10 carbon atoms and aralkyl radicals having 7 to 20 carbon atoms; wherein when n is 1, $R^1$ is selected from the same group of radicals as described for R and wherein when n is 2, $R^1$ is selected from the group consisting of straight chain or branched alkylene radicals having 2 to 10 carbon atoms and cycloalkylene radicals having 5 to 20 carbon atoms.

9. The rubber composition according to claim 1 wherein the diene rubber is selected from the group consisting of butyl rubber, ethylene-propylene terpolymers, copolymers of 1,3-butadiene and styrene, copolymers of 1,3-butadiene and acrylonitrile, and natural rubber.

10. The rubber composition according to claim 7 wherein the diene rubber is selected from the group consisting of butyl rubber, ethylene-propylene terpolymers, copolymers of 1,3-butadiene and styrene, copolymers of 1,3-butadiene and acrylonitrile, and natural rubber.

* * * * *